United States Patent [19]
Pratt et al.

[11] 3,933,757

[45] Jan. 20, 1976

[54] DICYCLOPENTADIENE THERMOSETTING POLYESTER

[75] Inventors: Ivor Pratt, Medina; Ulrich Boschert, Tallmadge, both of Ohio

[73] Assignee: SCM Corporation, New York, N.Y.

[22] Filed: Oct. 21, 1974

[21] Appl. No.: 516,447

Related U.S. Application Data

[63] Continuation-in-part of Ser. No. 330,474, Feb. 8, 1973, Pat. No. 3,883,612.

[52] U.S. Cl............ 260/75 A; 260/75 UA; 260/871
[51] Int. Cl.$^2$......................................... C08G 63/46
[58] Field of Search.............. 260/75 UA, 75 A, 871

[56] References Cited
UNITED STATES PATENTS

| | | | |
|---|---|---|---|
| 3,166,434 | 1/1965 | Gauger et al.......................... | 117/57 |
| 3,333,022 | 7/1967 | Reiners et al........................ | 260/869 |
| 3,340,327 | 9/1967 | Spellberg et al..................... | 260/861 |
| 3,347,806 | 10/1967 | Zimmermann......................... | 260/22 |
| 3,448,066 | 6/1969 | Parker.................................. | 260/22 |

*Primary Examiner*—Donald E. Czaja
*Assistant Examiner*—Earl A. Nielsen
*Attorney, Agent, or Firm*—Thomas M. Schmitz

[57] ABSTRACT

The invention pertains to a dicyclopentadiene modified thermosetting polyester polymer wherein dicyclopentadiene is preferentially esterified in the polymer chain. The dicyclopentadiene polyester polymer is mixed with an ethylenically unsaturated monomer to provide thermosetting polyester resin.

4 Claims, No Drawings

DICYCLOPENTADIENE THERMOSETTING POLYESTER

BACKGROUND OF THE INVENTION

This application is a continuation-in-part of our earlier filed application Ser. No. 330,474 filed on Feb. 8, 1973, now being U.S. Pat. No. 3,883,612, issued May 13, 1975 and the same is included herein by reference.

Unsaturated polyester polymers blended with vinyl monomers such as styrene are well-known molding resins that may be cured at room temperature or under heat and/or pressure to form thermoset plastic molded parts. Very often these molding resins include inert fillers, glass fibers, glass flakes, talcs, and the like for the purpose of obtaining improved impact strength, flexural strength and rigidity in the molded parts.

Dicyclopentadiene modified polyester polymers are known for a variety of uses including air drying coatings such as proposed in U.S. Pat. No. 3,448,066 and coating and laminating resins as proposed in U.S. Pat. No. 3,340,327. Prior art processes, however, are unsuitable due to the various reactivities of dicyclopentadiene wherein dicyclopentadiene can react differently depending on the reactants and the reaction temperature. At higher temperatures above about 320°F (160°C) dicyclopentadiene tends to depolymerize into cyclopentadiene and/or tends to react with unsaturated acids in a Diels-Alder reaction. Dicyclopentadiene further tends to both etherify and esterify by competing reactions at lower temperatures below about 310°F (154°C) which causes a polyester polymer to contain ether linkages as well as producing a polymer having characteristics that are difficult to reproduce on successive synthesis polymerizations even though the reactive components and reaction conditions are maintained consistent in successive syntheses.

It now has been found that these and other disadvantages in prior art methods of synthesizing dicyclopentadiene modified thermosetting polyester resins can be substantially eliminated by preferentially esterifying dicyclopentadiene under controlled processing conditions in accordance with this invention as well as provide a substantially improved dicyclopentadiene terminated polyester polymer. A particularly desirable use for dicyclopentadiene terminated polyester polymers is for compounding low-shrink molding compositions as disclosed in said copending application Ser. No. 330,474 filed Feb. 8, 1973 and incorporated herein by reference.

SUMMARY OF THE INVENTION

In accordance with this invention, a process for synthesizing a dicyclopentadiene-modified polyester resin is disclosed wherein the polyester resin is a dicyclopentadiene-terminated polyester polymer comprising dicyclopentadiene and glycol primarily esterified with unsaturated dibasic acids. The preferred process for synthesizing the dicyclopentadiene-terminated polyester polymer includes first producing an acid terminated prepolymer, and thereafter esterifying dicyclopentadiene with available carboxyl groups at temperatures less than 320°F, whereby dicyclopentadiene will be preferentially tied to the polyester backbone by ester linkages.

DETAILED DESCRIPTION OF THE INVENTION

Referring now to the resin composition of this invention, dicyclopentadiene terminated unsaturated polyester polymer (DCP-polyester) is mixed with ethylenically unsaturated monomer to produce a dicyclopentadiene-polyester resin.

The dicyclopentadiene-terminated polyester polymer preferably comprises a copolymer of glycol, unsaturated dicarboxylic acid, and about 0.1–0.4 mols of dicyclopentadiene per mole of unsaturated dicarboxylic acid. The dicyclopentadiene is preferentially esterified with carboxyl groups by prereacting excess molar equivalents of dicarboxylic acids with lesser molar equivalents of glycol to form an acid terminated partial polymer which is substantially free of free hydroxyl groups to avoid etherification of dicyclopentadiene with glycol hydroxyl groups. Thus dicyclopentadiene is reacted with an acid terminated glycol-dibasic acid partial polymer by esterifying the carboxyl groups to form a dicyclopentadiene-esterified polyester prepolymer. A particular environmental advantage of this process is that negligible dicyclopentadiene is lost to the atmosphere.

The preferred dicyclopentadiene-terminated polyester prepolymer is prepared by first charging into the reactor 2 molar equivalents of ethylenically unsaturated dicarboxylic acid per molar equivalent of glycol. The glycol and dicarboxylic acid mixture is then heated and reacted at esterification temperatures of about 300°F to 400°F until substantially all of the glycol is esterified by the excess molar equivalent of unsaturated dibasic acids. Completion of the glycol esterification can be measured by the acid number of the reactants becoming essentially constant, thus indicating no additional hydroxyl groups are available for esterification. Thereafter, dicyclopentadiene is added to the reactor and reacted with carboxyl groups on acid-terminated partial polymer at temperatures of less than 320°F, and preferably at temperatures of about 290–310°F. After the dicyclopentadiene is completely charged to the reactor, the reactant mixture is maintained at about 308°F until the acid number of the reactants becomes essentially constant thus indicating that dicyclopentadiene is preferentially esterified with available carboxyl groups of the acid terminated partial polymer. Thereafter, the remainder of the glycol charge can be added to the reactor whereupon the reaction is continued at temperatures of about 390°F to complete the formation of a dicyclopentadiene-terminated polyester polymer.

The glycols that can be used in synthesizing the dicyclopentadiene-terminated polyester polymer of this invention are conventional polyols and include, for example: ethylene glycol, propylene glycol, diethylene glycol, dipropylene glycol, butanediol, hexanediol, pentaerythritol, triethylene glycol, trimethylol propane, glycerol, or mixtures thereof. Preferably, the glycols used in this invention are propylene glycol and/or dipropylene glycol as the major glycol component.

The unsaturated dibasic acid components in the dicyclopentadiene-polyester are alpha, beta-unsaturated dicarboxylic acids or anhydrides and include, for example, maleic, fumaric, mesaconic, itaconic, citraconic, and the like or mixtures thereof. The anhydrides are preferred in the preparation of the dicyclopentadiene-esterified prepolymer. Saturated dibasic acids or anhydrides can be introduced into the dicyclopentadiene-polyester polymer to replace a portion of the unsaturated dicarboxylic acids. Conventional saturated dibasic acids include, for example, orthophthalic anhydride or acid, terephthalic acid, isophthalic acid, adipic acid, sebacic acid, succinic acid, and the like acids or anhydrides. Similarly, minor amounts of multifunctional acid such as trimellitic anhydride can be incorporated into the dicyclopentadiene-polyester backbone, on monocarboxylic acid such as benzoic acid.

Ethylenically unsaturated monomers copolymerizable with the ethylenic unsaturation in the polyester polymers are utilized to disperse or dissolve the dicyclopentadiene-terminated polyester polymer and form a dicyclopentadiene-polyester resin mixture. Such ethylenically unsaturated monomers are well known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and like unsaturated monomers or mixtures thereof. For reasons of efficiency and economy, the ethylenically unsaturated monomer preferred in forming the low profile molding resin of this invention is styrene. The dicyclopentadiene-terminated polyester polymer of this invention accommodates substantially increased amounts of unsaturated monomers in comparison to conventional polyester polymers and surprisingly improves the molded product and the molding process when increased amounts of monomer are used.

Catalysts and promoters often are incorporated in small amounts into thermosetting polyester resins containing ethylenically unsaturated monomer for curing or cross-linking the unsaturated polyester with the monomer. Such catalysts and promoters are well known and can be similarly utilized in this invention for curing the dicyclopentadiene-polyester polymer and monomer mixture. Typical catalysts, for example, include organic peroxides and peracids such as tertiary butyl perbenzoate, tertiary butyl peroctoate, benzoyl peroxide and the like. Examples of conventional promoters include cobalt octoate, cobalt napthenate, and amines such as diethylaniline. The amounts of catalysts and promoters ordinarily range between about 1% to 5% by weight of the resin and can be varied with the molding process and similarly varied with the level and types of inhibitors utilized, in a manner well known in the art.

Fibers, fillers and pigments normally added to polyester molding resin compositions can be likewise used in formulating the molding composition of this invention. Examples include: glass fibers, chopped fibers, chalk, kaolin, asbestos, kieselguhr, calcium carbonate, talc, ceramic spheres, and quartz. Examples of pigments include cadmium yellow, carbon black, iron oxide, titanium dioxide, etc., as well as organic pigments such as the phthaloorganamine blues and greens.

The following examples are provided to illustrate the preferred embodiments of this invention and are not intended to restrict the scope thereof. All parts are parts by weight, all percentages are expressed as weight percentages, and all temperatures are in degrees Fahrenheit, unless otherwise expressly specified.

EXAMPLE 1

A dicyclopentadiene-modified polyester polymer was synthesized from the following raw materials:
9.9 gram moles of propylene glycol (752 grams)
2.0 gram moles of dicyclopentadiene (264 grams)
10.0 gram moles of maleic anhydride (980 grams).

Polymer synthesis was carried out in an ordinary reaction vessel suitable for batch processing of polyesters and including an agitator, heating means, condenser, and inert gas flow.

FIRST STEP: Formation of an acid terminated partial copolymer of propylene glycol-maleic ester was made by charging 5.0 gram moles of propylene glycol and 10.0 moles of maleic anhydride together with 3% xylene (based on the charge) into the reaction vessel and by heating under inert gas to 300°F and holding at 300°F for about 30 minutes until the acid number of the batch became constant. The acid number became constant at about 412 whereupon the second step commenced.

SECOND STEP: A prepolymer was prepared by adding the 2.0 moles of the dicyclopentadiene to the propylene-maleic partial copolymer at a reaction temperature of 308°F. The 2.0 moles of dicyclopentadiene were mixed with 3% xylene and added to the reaction vessel at a steady and continuous rate for a time period of 30 minutes and the reaction then continued until the acid number of the batch leveled off at about 276.

THIRD STEP: A dicyclopentadiene-terminated polyester was prepared by charging the remaining 4.9 moles of propylene glycol to the foregoing prepolymer in the reaction vessel, together with 0.3 grams of hydroquinone. The batch temperature was gradually increased to about 390°F and further processed until an acid number of 30 was reached. A test sample of 7 parts resin mixed with 3 parts styrene yielded a viscosity of 3,600 centipoises at 77°F. Xylene and water of reaction were stripped from the batch.

FOURTH STEP: The dicyclopentadiene-polyester polymer was then cooled to 200°F, 0.5 grams of hydroquinone was added to the polymer which was then diluted with styrene to yield a dicyclopentadiene-polyester resin containing a ratio of 70 weight parts of dicyclopentadiene-polyester polymer and 30 weight parts of styrene monomer. Thereafter, about 1 gram ionol (Shell Oil Co.), a butylated hydroxy toluene, was added and the resin was discharged to a holding tank.

EXAMPLE 2

The dicyclopentadiene-terminated polyester of Example 1 was tested and had the following physical characteristics indicated in Table 1. SPI measurements were made on resin samples containing 1.5% tertiary-butyl perbenzoate at 260°F.

TABLE 1

| | |
|---|---|
| Viscosity at 60% NVM | 450 centipoises |
| Polymer Solids (Non-volatile material) | 60% |
| SPI gel time | 7 minutes |
| SPI reaction time | 6½ – 9½ minutes |
| SPI peak exotherm | 510°F. |
| Acid Number | 28 |
| Color | 4 G-H scale Brown |

EXAMPLE 3

A dicyclopentadiene-terminated polyester was synthesized similarly to Example 1 from the following components, except that dipropylene glycol was charged in the third step after the dicyclopentadiene was esterified with the acid terminated partial polymer in step 2:
0.5 moles of propylene glycol
1.0 moles of maleic anhydride
0.2 moles of dicyclopentadiene 0.5 moles of dipropylene glycol The resulting polymer was dispersed in styrene monomer to provide 60% NVM or 60 parts polymer and 40 parts styrene by weight as indicated in Example 1. Table 2 lists the characteristics of the resin.

TABLE 2

| | |
|---|---|
| Viscosity at 60% NVM | 360 centipoise (Brookfield) |
| Polymer Solids (Non-volatile material) | 60% |
| SPI gel time | 1.7 minutes |
| SPI reaction time | 2.5 reaction |
| SPI peak exotherm | 545°F. |
| Acid number | 21 |

While the invention has been illustrated by the foregoing examples, it is understood that various modifications are contemplated and may be made within the scope of this invention, as defined in the following claims.

What is claimed:

1. A method of synthesizing a thermosetting dicyclopentadiene terminated polyester from glycol, dicarboxylic acid, and dicyclopentadiene, said polyester suitable for mixing with sytrene to provide a thermosettable polyester resin, the improvement comprising:

reacting an excess molar equivalent of dicarboxylic acid with glycol to produce an acid terminated partial polymer having carboxyl groups;

reacting about 0.1–0.4 mols of dicyclopentadiene per mol of unsaturated dicarboxylic acid with said acid terminated partial polymer at temperatures between about 290°–310°F. until substantially all of said dicyclopentadiene is esterified with said carboxyl groups.

2. The process of claim 1 wherein the dicyclopentadiene reacts with said acid terminated partial polymer to form an acid terminated prepolymer, and additional glycol is reacted with said prepolymer to further esterify unreacted carboxyl groups.

3. The process of claim 2 wherein about one-half the glycol requirements is first reacted with excess molar dicarboxylic acid, and the other one-half of the glycol requirements is reacted after the intermediate step of esterifying said dicyclopentadiene with said acid terminated partial polymer.

4. A dicyclopentadiene terminated, thermosetting polyester wherein dicyclopentadiene is substantially esterified with carboxyl groups of the acid terminated partial polymer in accordance with the process set forth in claim 1.

* * * * *